United States Patent
Deshpande et al.

(10) Patent No.: US 9,747,805 B2
(45) Date of Patent: Aug. 29, 2017

(54) COMPUTING A SIMILARITY MEASURE OVER MOVING OBJECT TRAJECTORIES

(71) Applicant: International Business Machines Corporation, Armonk, NY (US)

(72) Inventors: Prasad M. Deshpande, Bangalore (IN); Deepak S. Padmanabhan, Bangalore (IN); Sriram Raghavan, Bangalore (IN); Sayan Ranu, Bangalore (IN); Aditya D. Telang, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/955,146

(22) Filed: Jul. 31, 2013

(65) Prior Publication Data

US 2015/0039217 A1 Feb. 5, 2015

(51) Int. Cl.
*G01C 21/20* (2006.01)
*G08G 1/00* (2006.01)
*G01C 21/26* (2006.01)
*G01S 5/02* (2010.01)

(52) U.S. Cl.
CPC .............. *G08G 1/20* (2013.01); *G01C 21/26* (2013.01); *G01S 5/02* (2013.01); *G01S 5/0294* (2013.01)

(58) Field of Classification Search
CPC .................................. G01C 21/26; G08G 1/20
See application file for complete search history.

(56) References Cited

U.S. PATENT DOCUMENTS

| | | | |
|---|---|---|---|
| 7,016,781 B1 | 3/2006 | Wolfson | |
| 7,299,126 B2 | 11/2007 | Gedik et al. | |
| 2005/0096841 A1* | 5/2005 | Gedik et al. | 701/207 |
| 2011/0106833 A1 | 5/2011 | Albers et al. | |
| 2012/0170802 A1 | 7/2012 | Millar et al. | |

OTHER PUBLICATIONS

Ossama, Omnia et al., "Similarity Search in Moving Object Trajectories," 15th International Conference on Management of Data, COMAD 2009, Mysore, India, Dec. 9-12, 2009, 6 pages, Computer Society of India.

(Continued)

*Primary Examiner* — Mussa A Shaawat
*Assistant Examiner* — Kyung Kim
(74) *Attorney, Agent, or Firm* — Ference & Associates LLC

(57) ABSTRACT

Methods and arrangements for measuring similarity with respect to moving object trajectories. First and second moving object trajectories are input, each trajectory being defined by at least two spatial dimensions and a temporal dimension. At least one segment is defined with respect to each trajectory, each segment being defined between two defining points. At least one segment from the first trajectory is matched with at least one segment from the second trajectory. A spatial distance and temporal distance are each computed between the at least one segment from the first trajectory and the at least one segment from the second trajectory. The spatial distance and temporal distance are combined to provide a measure of a spatio-temporal distance between the at least one segment from the first trajectory and the at least one segment from the second trajectory. Other variants and embodiments are broadly contemplated herein.

20 Claims, 10 Drawing Sheets

(56) References Cited

OTHER PUBLICATIONS

Trajcevski, Goce et al., "Dynamics-Aware Similarity of Moving Objects Trajectories," ACM GIS 2007, Seattle, Washington, USA, Nov. 7-9, 2007, 8 Pages, ACM Digital Library.
Han, Xiaoying, "Research on Clustering Trajectories for Moving Objects," 2011 International Conference on Computer Science and Network Technology, Harbin, China, Dec. 24-26, 2011, pp. 2819-2822, IEEE Digitial Library.
Chen, Lei et al., "On the Marriage of Lp-norms and Edit Distance," Proceedings of the 30th VLDB Conference, Toronto, Canada, Aug. 29-Sep. 3, 2004, pp. 792-803, Very Large Data Base Endowment, Inc., IBM Almaden Research Center, California, USA.
Chen, Lei et al., "Robust and Fast Similarity Search for Moving Object Trajectories," SIGMOD 2005, Baltimore, Maryland, USA, Jun. 14-16, 2005, 12 pages, ACM Digital Library.
Vlachos, Michail et al., "Discovering Similar Multidimensional Trajectories," Proceedings of the 18th International Conference on Data Engineering, San Jose, California, USA,ICDE 2002, Feb. 26-Mar. 1, 2002, 12 pages. Can be found at http://www.cs.bu.edu/groups/dblab/pub_pdfs/icde02.pdf accessed Jul. 30, 2013.
Frentzos, Elias et al.,"Index-based Most Similar Trajectory Search," Proceedings of the 23rd International Conference on Data Engineering, ICDE 2007, Istanbul, Turkey, Apr. 15-20, 2007, pp. 1-10. Available at http://infolab.cs.unipi.gr/pubs/confs/FGT_ICDE07.pdf accessed Jul. 30, 2013.
Yi, Byoung-Kee et al., "Efficient Retrieval of Similar Time Sequences Under Time Warping," Oct. 9, 1997, 20 pages. Available at http://infolab.usc.edu/csci599/Fall2002/paper/A4_yi97efficient.pdf accessed Jul. 30, 2013.
Ding, Zhiming et al., "Collecting and Managing Network-Matched Trajectories of Moving Objects", DEXA 2011, Part I, LNCS 6860, A. Hameurlain et al. (Eds.), pp. 270-279, Springer-Verlag, Berlin/Heidelberg, Germany.
Kim, Sang-Wook et al., "Path Prediction of Moving Objects on Road Networks Through Analyzing Past Trajectories", KES 2007/WIRN 2007, Part I, LNAI 4692, Apolloni et al. (Eds.), pp. 379-389, Springer-Verlag, Berlin/Heidelberg, Germany.

* cited by examiner

Given two trajectories $A=\{a_1, a_2,...,a_n\}$ with segment set $\{(a_1, a_2),...,(a_{n-1}, a_n)\}$ and $B=\{b_1, b_2,...,b_m\}$ with segment set $\{(b_1, b_2),...,(b_{m-1}, b_m)\}$, minimize the function $ED(A,B)$.

$$ED(A,B) = \begin{cases} 0 & \text{if both A and B are empty} \\ \infty & \text{if either A and B are empty} \\ \min \begin{cases} ED(R(A), R(B)) + Match(H(A), H(B)) \\ ED(A_{H(B)}, R(B)) + Project(H(B), H(A)) \\ ED(R(A), B_{H(A)}) + Project(H(A), H(B)) \end{cases} \end{cases}$$

$Match(s_1, s_2) = L_2(s_1.p_1, s_2.p_1) + L_2(s_1.p_2, s_2.p_2) \quad s_1 \in T_1, s_2 \in T_2$ $Project(s_1, s_2) = L_2(s_1.p_1, s_2.p_1) + L_2(s_1.p_2, s_2.p_1) * \dfrac{length(s_1) + length(s_2)}{length(T_1) + length(T_2)} + L_2(s_2.p_1, s_2.p_2, s_1.p_1') * \dfrac{length(s_1) + L_2(s_2.p_1, s_2.p_2, s_1.p_2')}{length(T_1) + length(T_2)} \quad s_1 \in T_1, s_2 \in T_2,$ p' lies on $s_2$ and is the closest point to $s_1.p2$ $A_s = \{p', a_2, ..., a_n\}$, where p' is the projection of s.p2 on H(A).

FIG. 5

COMPUTING A SIMILARITY MEASURE OVER MOVING OBJECT TRAJECTORIES

BACKGROUND

Generally, with a significant increase in the availability of GPS (global positioning system)-enabled devices, such as smart phones and car navigation systems, there is an array of applications that can benefit from the ability to monitor, track, and query trajectories of moving objects. Example application domains include traffic monitoring, GPS-based routing, security and public safety. However, conventional efforts have fallen far short of their potential to accurately determine and track complex trajectories.

BRIEF SUMMARY

In summary, one aspect of the invention provides a method of measuring similarity with respect to moving object trajectories, said method comprising: inputting first and second moving object trajectories, each trajectory being defined by at least two spatial dimensions and a temporal dimension, each trajectory including at least two defining points; defining at least one segment with respect to each trajectory, each segment being defined between two defining points; matching at least one segment from the first trajectory with at least one segment from the second trajectory; computing a spatial distance between the at least one segment from the first trajectory and the at least one segment from the second trajectory; computing a temporal distance between the at least one segment from the first trajectory and the at least one segment from the second trajectory; and combining the spatial distance and temporal distance to provide a measure of a spatio-temporal distance between the at least one segment from the first trajectory and the at least one segment from the second trajectory.

Another aspect of the invention provides an apparatus comprising: at least one processor; and a computer readable storage medium having computer readable program code embodied therewith and executable by the at least one processor, the computer readable program code comprising: computer readable program code configured to input first and second moving object trajectories, each trajectory being defined by at least two spatial dimensions and a temporal dimension, each trajectory including at least two defining points; computer readable program code configured to define at least one segment with respect to each trajectory, each segment being defined between two defining points; computer readable program code configured to match at least one segment from the first trajectory with at least one segment from the second trajectory; computer readable program code configured to compute a spatial distance between the at least one segment from the first trajectory and the at least one segment from the second trajectory; computer readable program code configured to compute a temporal distance between the at least one segment from the first trajectory and the at least one segment from the second trajectory; and computer readable program code configured to combine the spatial distance and temporal distance to provide a measure of a spatio-temporal distance between the at least one segment from the first trajectory and the at least one segment from the second trajectory.

An additional aspect of the invention provides a computer program product comprising: a computer readable storage medium having computer readable program code embodied therewith, the computer readable program code comprising: computer readable program code configured to input first and second moving object trajectories, each trajectory being defined by at least two spatial dimensions and a temporal dimension, each trajectory including at least two defining points; computer readable program code configured to define at least one segment with respect to each trajectory, each segment being defined between two defining points; computer readable program code configured to match at least one segment from the first trajectory with at least one segment from the second trajectory; computer readable program code configured to compute a spatial distance between the at least one segment from the first trajectory and the at least one segment from the second trajectory; computer readable program code configured to compute a temporal distance between the at least one segment from the first trajectory and the at least one segment from the second trajectory; and computer readable program code configured to combine the spatial distance and temporal distance to provide a measure of a spatio-temporal distance between the at least one segment from the first trajectory and the at least one segment from the second trajectory.

A further aspect of the invention provides a method comprising: computing spatial and temporal similarity between two moving object trajectories; said computing comprising: counting sampling points with respect to each trajectory; in response to said counting, determining whether one trajectory has more sampling points than the other trajectory and, if so, projecting at least one sampling point from the trajectory with more sampling points onto the trajectory with fewer sampling points; dividing each of the trajectories into segments; and matching and comparing each segment one-to-one with a segment from the other trajectory, and determining spatial and temporal similarity between pairs of segments between the trajectories.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5 provides an overview of computation of optimal spatial matching.

DETAILED DESCRIPTION

Figure 1:
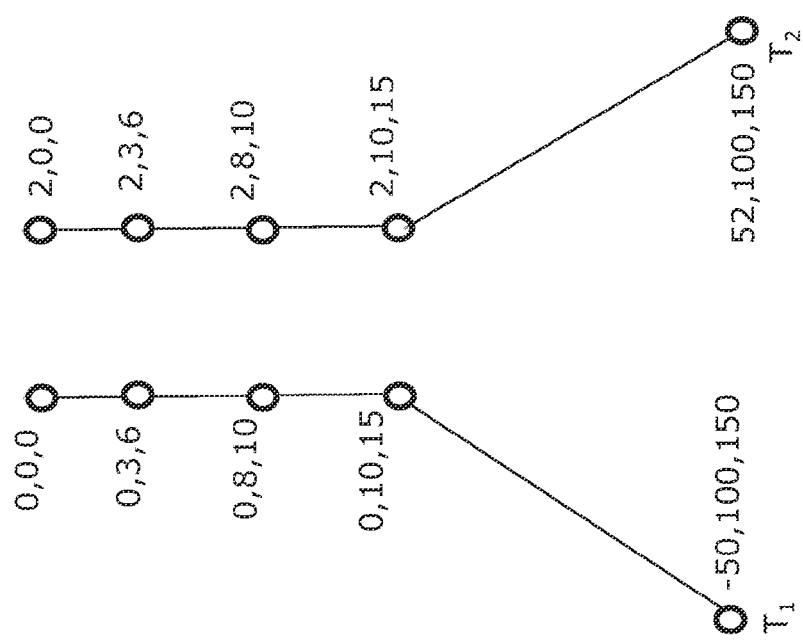
FIG. 1 is a diagram graphically illustrating a conventional bias towards sampling rates.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-9. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an example embodiment, most if not all of the process steps, components and outputs discussed with respect to FIGS. 1-9 can be performed or utilized by way of a processing unit or units and system memory such as those indicated, respectively, at 16' and 28' in FIG. 10, whether on a server computer, a client computer, a node computer in a distributed network, or any combination thereof.

As considered herein, in accordance with at least one embodiment of the invention, given a database of trajectories and a query trajectory, a system analyzes the database and responds to: k nearest neighbor (k-NN) queries (to find the k most similar trajectories in the database when compared to the query); and range queries (to find the database trajectories which have a distance within a certain user-provided threshold).

Conventionally, a similarity measure is relied upon in performing an analysis on trajectory databases; such analysis can involve any or all of, by way of illustration: clustering, frequent pattern mining, indexing top-k and range queries, and prediction. Trajectory similarity is dependent on spatial proximity throughout the run of the trajectories being compared, and through transition times between regions of those trajectories.

As such, matching trajectories can pose a number of unique challenges beyond the scope of traditional similarity measures. For instance, update rates may vary across trajectories. Also, recorded spatial coordinates may be imprecise and noisy. For example, GPS is typically accurate to within 10 m, while triangulation-based location detection in cell phones is typically accurate up to a radius of 100 meters. Also, the length of trajectories may differ based on the routes used, and trajectory matching warrants capturing distance both in spatial and temporal characteristics.

In accordance with at least one embodiment of the invention, a fundamental challenge is successfully addressed in building a system to query and analyze trajectories. Particularly, a distance (or similarity) function is contemplated herein that is capable of managing noise, non-uniform sampling rates, and comparison across both spatial and temporal characteristics.

FIG. 1 is a diagram graphically illustrating a conventional bias towards sampling rates, particularly towards densely sampled regions. As discussed and contemplated herethroughout, any and all illustrated sets of three (grouped) coordinates indicate first and second dimensions of spatial coordinates, and a temporal measure, respectively. Here, since $T_1$ and $T_2$ are spatially close in densely sampled regions (four sampled pairs of points shown here), conventional distance functions will return a small distance score. However, for a major part of the trajectories, they are highly dissimilar, thus reflecting a severe inaccuracy in the calculated small distance score; in other words, only one sampled pair of coordinates (that towards the bottom of the figure) reflects anything resembling a divergence in trajectory, while the four sampled pairs that are spatially similar will normally be more heavily weighted or accounted for (even if only by dint of sampling frequency) and thus will more strongly bias the calculated (inter-trajectory) distance score.

Figure 2:
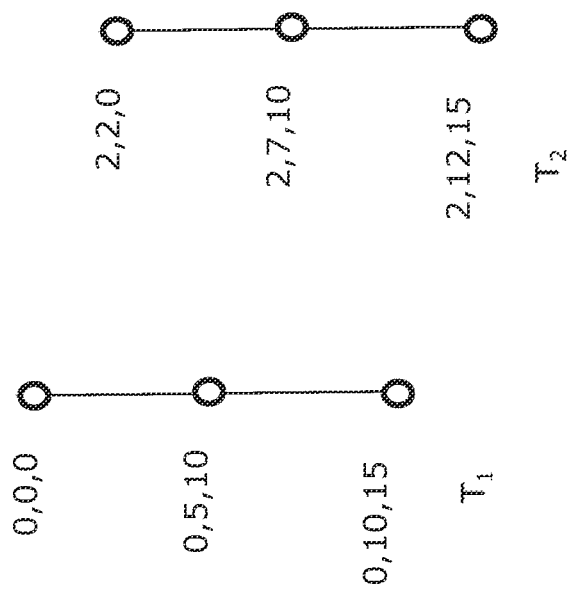
FIG. 2 is a diagram graphically illustrating a conventional problem with learning thresholds.

FIG. 2 is a diagram graphically illustrating a conventional problem with learning thresholds. Here, conventional threshold-based distance metrics will not match any of the points between $T_1$ and $T_2$ at a spatial threshold of 2. However, the trajectories are spatially within 2 units of distance for the major part of their existence, and this similarity should be accounted for.

Figure 3:
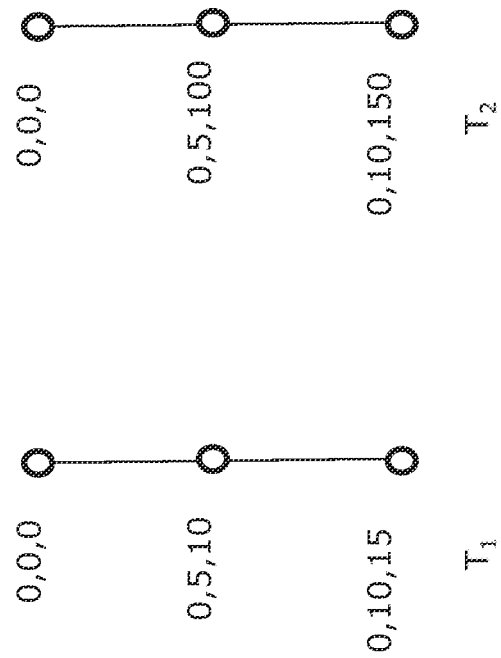
FIG. 3 is a diagram graphically illustrating a conventional problem in capturing both spatial and temporal distance.

FIG. 3 is a diagram graphically illustrating a conventional problem in capturing both spatial and temporal distance. While $T_2$ is identical to $T_1$ spatially, temporally they are dissimilar. Conventional metrics that only compare spatial similarity fail to capture the temporal dissimilarity, while other metrics typically fail to capture the spatial similarity due to the large dissimilarity in the temporal domain of $T_1$ and $T_2$.

It is recognized, in accordance with at least one embodiment of the invention, that a fundamental weakness in existing distance functions stems from trying to match regions/points between trajectories rather than segments, inasmuch as points only represent a small sample of the locations traversed by a trajectory. As a result, much of the information is lost when the inter-point relationships are ignored. Furthermore, to match points has the effect of biasing a distance score towards densely sampled regions (as in FIG. 1). Thus, a more accurate and robust distance can be computed by comparing segments across trajectories rather than points, wherein a segment can be considered to be a line between two consecutive points in a trajectory. In comparing segments, it is possible to capture shape as well as a more principled management of non-uniform sampling rates.

Figure 4:
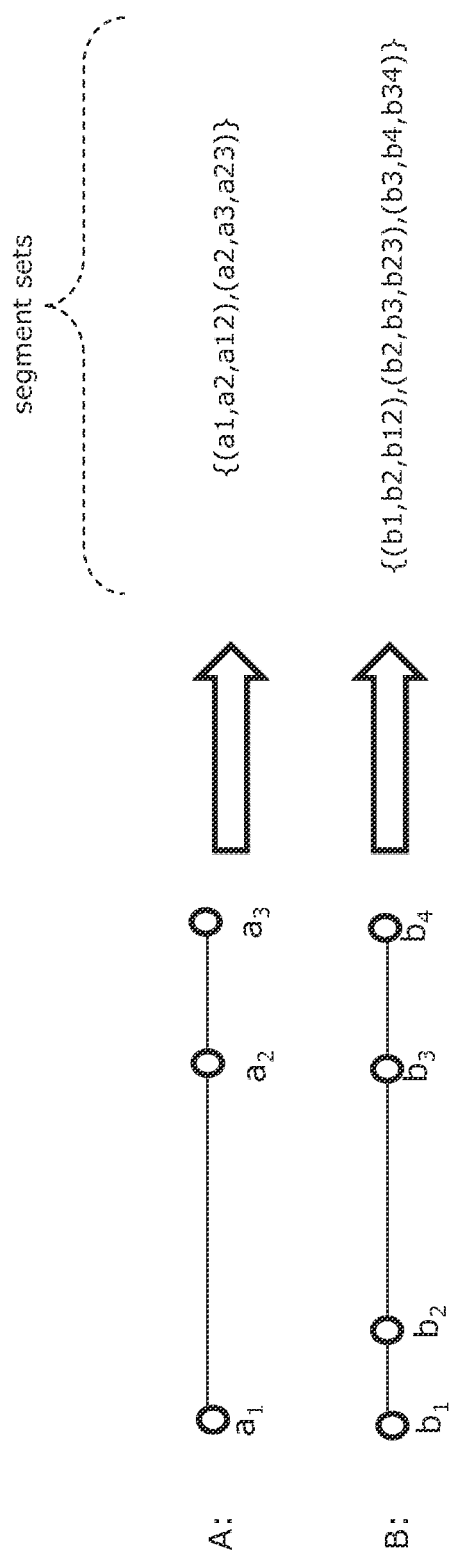
FIG. 4 is a diagram graphically illustrating an editing of distance via representing trajectories with segment sets.

FIG. 4 is a diagram graphically illustrating an editing of distance via representing trajectories with segment sets, in accordance with at least one embodiment of the invention. As such, a distance metric as proposed herein can employ particular strategies to match trajectories. First, each trajectory is converted into segment sets as shown in FIG. 4; each segment set here is shown as being defined by a start point, an end point, and a temporal measure between start and end points, hence (for example) "a1,a2,a12" for a segment defined between $a_1$ and $a_2$. Next, optimal matching is computed between segment sets. In this vein, segments can be matched in two ways: one-to-one matching, where the end points of the segments are matched; and projection, where one of the endpoints in the first segment is projected to the closest point in the second segment. Finally, a 2-dimensional spatio-temporal score is computed where optimal alignment is based on spatial matching, and temporal distance is computed corresponding to the optimal spatial matching.

In accordance with at least one embodiment of the invention, FIG. 5 provides an overview of computation of optimal spatial matching. Here, it is assumed that the endpoint of segment A is projected to the closest point in segment B. In this case, segment B is "stretched" in the sense that B has been partitioned into two segments. The first partition of B starts from its original start point and ends at the projected point of A's end point on B. B's second partition starts from this same projected point and ends at its original end point.

Figure 6:
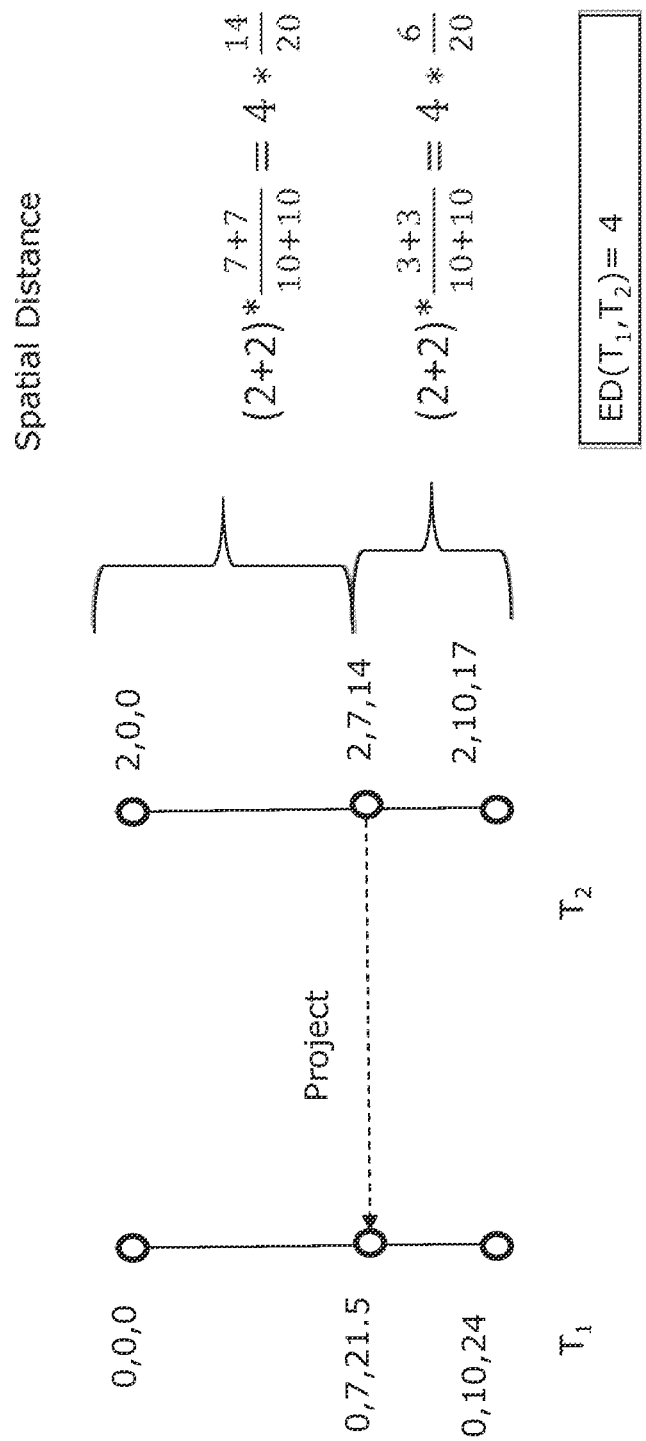
FIG. 6 is a diagram graphically illustrating computation of optimal spatial matching.

In accordance with at least one embodiment of the invention, FIG. 6 is a diagram graphically illustrating computation of optimal spatial matching. As shown in FIG. 6, a projection is made to create an intermediate data point in $T_1$ where otherwise no data have been sampled.

Figure 7:
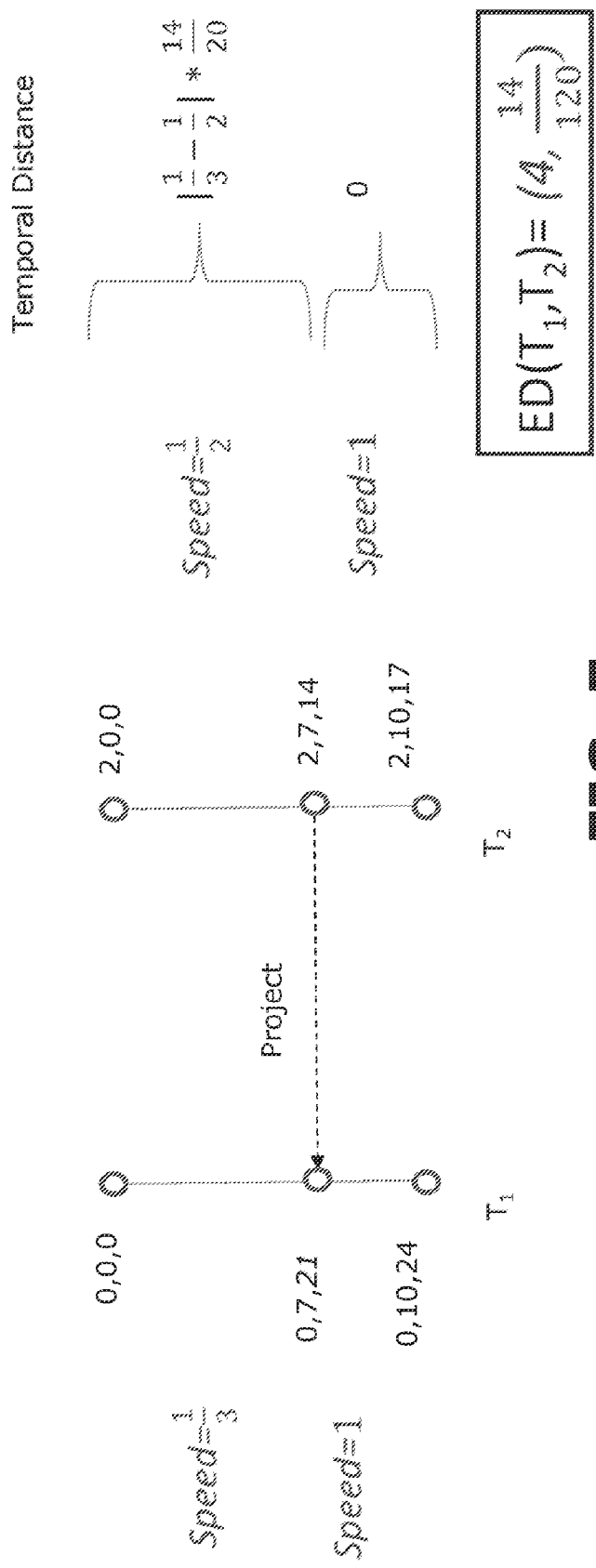
FIG. 7 is a diagram graphically illustrating temporal distance corresponding to optimal spatial matching.

FIG. 7 is a diagram graphically illustrating a temporal distance corresponding to optimal spatial matching, in accordance with at least one embodiment of the invention. Here, speed is computed for each segment, while temporal distance is equal to the absolute speed difference on matched segments.

Accordingly, it can be appreciated from the foregoing that optimal spatial matching, as broadly contemplated herein in accordance with at least one embodiment of the invention, can help establish accurate projections with respect to undersampled data of a trajectory, thus facilitating an easier comparison between trajectories in general.

The disclosure now turns to a discussion of some background aspects relating to at least one embodiment of the invention, and by way of illustrative example. "Edit Distance with Projections", or "EDwP", refers to a process for calculating distance between trajectories (e.g., in which two spatial dimensions and a temporal dimension are included), and reference may continue to be made to FIGS. 1-7 as needed, as well as FIG. 8 (introduced herebelow).

By way of preliminary concepts, in accordance with at least one embodiment of the invention, a trajectory $T=\{s_1, \ldots, s_n\}$ is a temporally ordered sequence of spatio-temporal points (st-points). An st-point $s=([v_1, \ldots, v_d], t)$ contains a d-dimensional feature vector describing the spatial attributes and a timestamp t encoding the time at which the location is recorded. A sub-trajectory can be defined wherein trajectory $T_1$ is a sub-trajectory of $T_2$ if $\forall i, 1 \leq i \leq |T_1| T_1.s_i = T_2.s_{a+i}$, where $\exists a, 0 \leq a \leq (|T_2|-|T_1|)$. The relationship is denoted using the notation $T_1 \sqsubseteq T_2$.

Informally, in accordance with at least one embodiment of the invention, $T_1$ is a sub-trajectory of $T_2$ if $T_1$ is formed by a sequence of contiguous st-points from $T_2$. To denote the specific sequence of st-points that define $T_1$, the notation $T_1 = T_2[a, \ldots, b]$ is used. Additionally, the empty trajectory, $\varnothing$, is a subset of all trajectories, i.e., $\varnothing \sqsubseteq T \forall T$. Without loss of generality, it can be assumed that the movement of trajectories is constrained within a 2D (two-dimensional) plane. Owing to this assumption, an st-point $s=(x,y,t)$ is captured using three dimensions, where x and y represent the coordinates of the spatial location, and t the timestamp.

Generally, in accordance with at least one embodiment of the invention, it can be appreciated from discussion herein that matching only st-points across trajectories is not enough. Such a strategy restricts itself to only comparing the sampled regions and non-sampled regions are ignored. To avoid this bias, a concept of spatio-temporal segments (st-segments) is employed. As such, a spatio-temporal segment $e=[s_1, s_2, f(\bullet)]$ represents a segment connecting two temporally consecutive st-points $s_1$ and $s_2$ through an interpolating function $f(\bullet)$; this interpolating function models the movement of the object in the intermediate time interval $s_{t_1}$ to $s_{t_2}$. The notation $e.s_1$ and $e.s_2$ is used to denote the two endpoints of e respectively, and $s \in e$ to denote an st-point s lying within st-segment e.

In accordance with at least one embodiment of the invention, it will be appreciated that st-segments are better descriptors of trajectories, since they characterize the entire trajectory shape under a given set of observations. If $f(\bullet)$ is assumed to be a straight line connecting $s_1$ and $s_2$, an st-segment between $s_1$ and $s_2$ can be represented as $e=[s_1, s_2]$ since $f(\bullet)$ is implicit. With the introduction of an st-segment, hereon, a trajectory is represented as a sequence of segments rather than points. The notion of a sub-trajectory is extended analogously.

Figure 8:
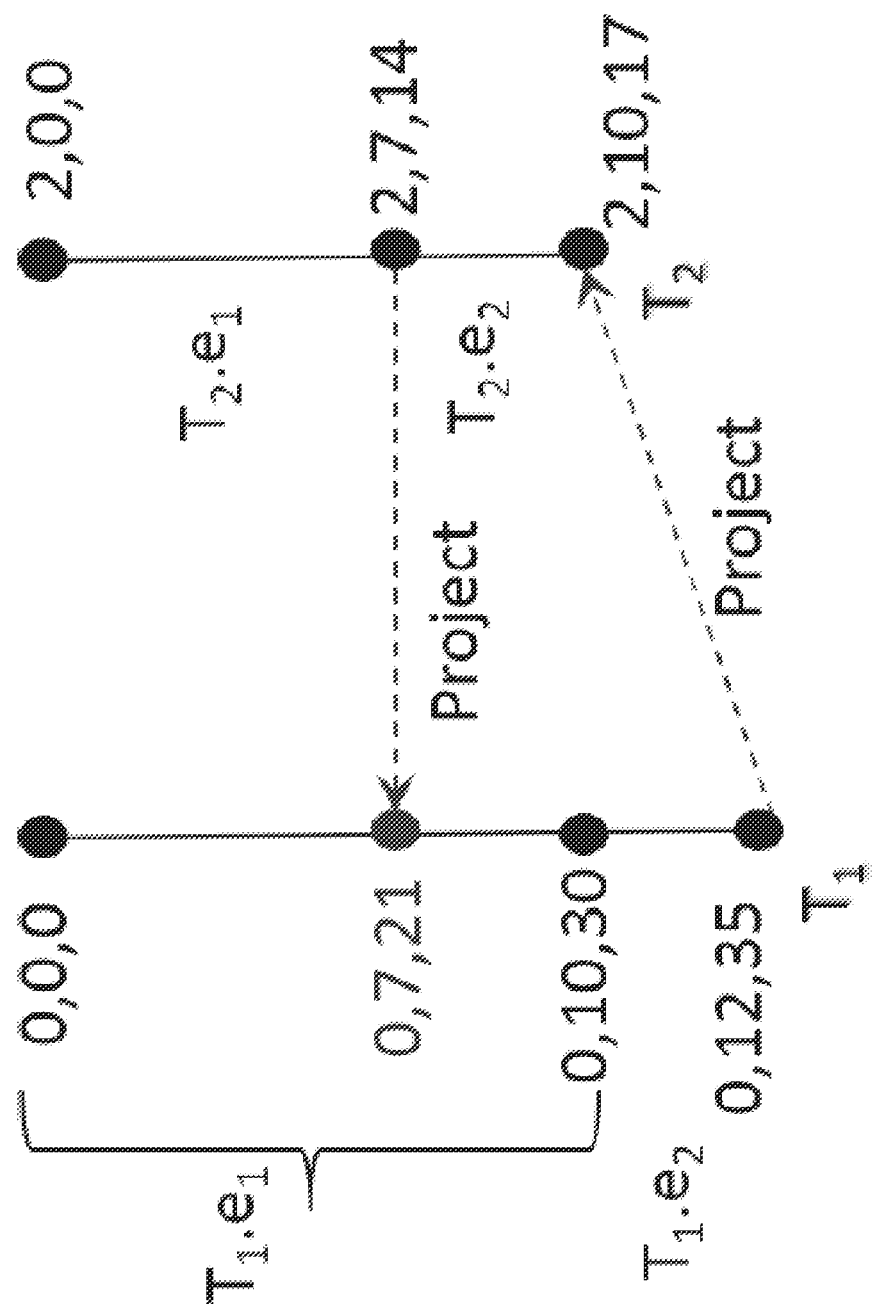
FIG. 8 is a diagram which illustrates an example of calculating distance between trajectories using projection.

By way of an illustrative example, in accordance with at least one embodiment of the invention, consider the trajectories in FIG. 8, which illustrates another example of calculating distance between trajectories by using projection. Using the idea of st-segments, $T_1=\{[(0,0,0),(0,10,30)],[(0,10,30),(0,12,35)]\}$ and $T_2=\{[(2,0,0),(2,7,14)],[(2,7,14),(2,10,17)]\}$. As such, the length of a trajectory T can now be expressed in terms of its constituent segments $e_i \in T$:

$$\text{length}(T) = \sum_{\forall e_i \in T} \text{length}(e_i)$$

$$\text{length}(e_i) = \text{dist}(e_i \cdot s_1, e_i \cdot s_2)$$

Based on the length of segment e, the speed within e is defined as speed $$(e) = \frac{\text{length}(e)}{e \cdot s_{2_i} - e \cdot s_{1_i}}.$$

In accordance with at least one embodiment of the invention, a process to "edit distance with projections", or "EDwP", computes a two-dimensional spatio-temporal distance. While the first dimension quantifies the spatial distance between two trajectories, the second dimension represents the temporal distance. Based on the needs of an application, each dimension can be appropriately queried to identify trajectories of interest. For example, there may be applications where both dimensions are of equal interest and thus, recommendations should be computed by performing a range search over both dimensions. On the other hand, for an unusual application such as a migration pattern analysis of animal behaviors, a skyline query can be performed on the 2D spatio-temporal distances to investigate the spectrum of spatial and temporal similarities in flocking behaviors.

In accordance with at least one embodiment of the invention, and as described in detail herein, it can be appreciated that st-segments are a better descriptor of trajectories than st-points. EDwP acknowledges this property and computes the optimal matching between two segment sequences. The computation is performed in two phases. In the first phase, referred to herein as "EDwP.s", optimal matching is computed based on just the spatial attributes of trajectories. In the second phase, referred to herein as "EDwP.t", temporal distance is computed by observing the differences in speeds within the spatially matched portions.

In accordance with at least one embodiment of the invention, optimal spatial matching between trajectories $T_1$ and $T_2$ is computed based on the "cheapest" set of edits that can be performed to convert $T_1$ to $T_2$. EDwP.s performs two kinds of edits: replacements and inserts. Note that a "delete" can be represented using an insert with respect to a task of distance computation. More specifically, in a comparison between segments $e_1$ and $e_2$, deleting an st-point from $e_1$ is equivalent to inserting the same point in $e_2$.

Generally, in accordance with at least one embodiment of the invention, the cost of replacing segment $e_1$ with $e_2$, denoted as rep($e_1,e_2$), is defined as follows:

rep($e_1,e_2$)=dist($e_1.s_1,e_2.s_1$)+dist($e_1.s_2,e_2.s_2$)

As can be seen, rep($e_1,e_2$) is symmetric and the cost is proportional to the spatial distance between the endpoints of $e_1$ and $e_2$.

In accordance with at least one embodiment of the invention, to insert segment $e_1$ in $e_2$, denoted as ins($e_1,e_2$), the goal is to partition $e_2$ into two halves by projecting the endpoint $e_1.s_2$ to $e_2$, such that distance between $e_1$ and the first partition of $e_2$ is minimized. The projection of an st-point s on segment e, denoted as π(s,e), is the st-point p∈e that is closest to s. Mathematically, $$\pi(s, e) = \text{argmin}_{p \in e} \text{dist}(s, p)$$

$$\pi(s, e)_t = e \cdot s_{1_t} + \frac{\text{dist}(e \cdot s_1, \pi(s, e))}{\text{speed}(e)}$$

The two partitions of $e_2$ following the insertion of the projected point are segments [$e_2.s_1,\pi(e_1.s_2,e_2)$] and [$\pi(e_1.s_2,e_2),e_2.s_2$]. The cost of ins($e_1,e_2$) is:

ins($e_1,e_2$)=dist($e_1.s_1,e_2.s_1$)+dist($e_1.s_2,\pi(e_1.s_2,e_2)$))

Thus, ins($e_1,e_2$) is precisely the cost of replacing segment $e_1$ with the first of the two sub-segments of $e_2$, which is derived from the split during the insert operation. By way of an illustrative example, referring to FIG. 8, it can be seen that rep($T_1.e_1,T_2.e_1$)=2+3.61=5.61.

ins($T_2.e_1,T_1.e_1$)=2+2=4.

In accordance with at least one embodiment of the invention, it can be appreciated that deletes are the reverse of inserts. More specifically, in d($e_1,e_2$), the goal is to "expand" $e_2$ by deleting $e_2.s_2$ and joining it with the segment following $e_2$ in its trajectory so that the distance between $e_1$ and the "expanded" $e_2$ is minimized. The cost of d($e_1,e_2$) is computed in the same manner as an insert:

d($e_1,e_2$)=dist($e_1.s_1,e_2.s_1$)+dist($\pi(e_2.s_2,e_1),e_2.s_2$)

As can be seen, d($e_1,e_2$)=ins($e_2,e_1$).

In accordance with at least one embodiment of the invention, with the formalization of the edit operations, EDwP.s can next be defined to compute the cheapest set of edits to convert $T_1$ to $T_2$:

$$EDwP.s(T_1, T_2) = \begin{cases} 0 & \text{if } |T_1| = |T_2| = 0 \\ \infty & \text{else if } |T_1| = 0 \text{ or } |T_2| = 0 \\ \min\{EDwP.s\$(Rest(T_1), Rest(T_{2_{T_i,c_i}})) + \text{otherwise} \\ \quad (\text{ins}(T_1 \cdot e_1, T_2 \cdot e_1) * \text{Coverage}(T_1 \cdot e_1, T_{2_{T_i,c_i}} \cdot e_1)), \\ EDwP.s(Rest(T_{1_{T_2,c_i}}), Rest(T_2)) + \\ \quad (\text{ins}(T_2 \cdot e_1, T_1 \cdot e_1) * \text{Coverage}(T_2 \cdot e_1, T_{1_{T_2,c_i}} \cdot e_1)), \\ EDwP.s(Rest(T_1), Rest(T_2)) + \\ \quad (\text{rep}(T_1 \cdot e_1, T_2 \cdot e_1) * \text{Coverage}(T_1 \cdot e_1, T_2 \cdot e_1))\} \end{cases}$$

where, $T_{T'.e_1}$ denotes trajectory T after inserting segment T'.$e_1$ in T.$e_1$. More specifically, if T=[$e_1, \ldots, e_n$], then $T_{T'.e_1}$=[[$e_1.s_1,\pi(T'.e_1.s_2,T.e_1)$],[$\pi(T'.e_1.s_2,T.e_1),e_1.s_2$],$e_2, \ldots, e_n$]. In other words, $T_{T'.e_1}$ is formed by the insertion of the st-point \\$\pi(T'.e_1.s_2,T.e_1)$ in between the first and second st-points in T.

In accordance with at least one embodiment of the invention, a "coverage" measure quantifies the importance an edit based on how representative the segments being edited are of the overall trajectories:

Coverage($e_1,e_2$)=length($e_1$)+length($e_2$)

As can be seen, larger segments have more weight on the overall distance than smaller segments. By way of illustrative example, the cheapest sequence of edits to convert $T_1$ to $T_2$ in FIG. 8 is ins([(2,0,0),(2,7,14)],[(0,0,0),(0,10,30)]) followed by ins([(0,7,21),(0,10,30)],[(2,7,14),(2,10,17)]), and ins([(0,10,30),(0,12,35)],[(2,10,17),(2,10,17)]) with contributions 4*(7+7), 4*(3+3) and (2+√8)*2, respectively, on the overall distance. Thus, EDwP.s($T_1,T_2$)=89.65.

As such, in accordance with at least one embodiment of the invention, it can be appreciated that EDwP.s($T_1,T_2$) is symmetric and can be interpreted as the cumulative distance between each point traversed by $T_1$ and its corresponding matched point in $T_2$. In most cases, the distance is likely to increase monotonically with the length of the trajectories (unless the extra length improves the alignment, as could happen in certain cases). Consequently, EDwP.s favors shorter trajectories. If, for an application, the average distance between matched points is a more accurate measure than the cumulative distance, then the following length-normalized distance can be used:

$$EDwP_{avg}(T_1, T_2) \cdot s = \frac{EDwP.s(T_1, T_2)}{\text{length}(T_1) + \text{length}(T_2)}$$

In accordance with at least one embodiment of the invention, it can be appreciated that there are some distinguishing features of EDwP.s that make it robust to noise. In matching segments, EDwP.s operates in the space of st-segments and thus not restricted to matching only the sampled st-points. This feature allows EDwP.s to deal with phase shifts in a systematic and accurate manner. In managing non-uniform sampling rates, EDwP.s automatically adapts using "coverage" as discussed above. Further, by employing a recursive formulation, EDwP.s recognizes local time shifts and performs edits accordingly to compute the optimal spatial alignment for trajectories moving at dissimilar speeds. Additionally, EDwP.s is not dependent on thresholds.

In accordance with at least one embodiment of the invention, after computing optimal spatial alignment, the temporal distance between two trajectories can be computed. The temporal distance computation builds on the spatial alignment computed in a manner as discussed herein, and compares the differences in speeds within the matched portions.

In accordance with at least one embodiment of the invention, let $T_{1'}$ and $T_{2'}$ be the edited versions of $T_1$ and $T_2$ after points are inserted in each trajectory to compute the optimal spatial alignment using EDwP.s($T_1,T_2$). For example, $T'_1 = [T_1.s_1,(0,7,21),T_1.s_2,T_1.s_3]$ (using the sequence of st-points representation to avoid repetition of st-points) and $T'_2 = [T_2.s_1,T_2.s_2,T_2.s_3,(2,10,17)]$, using the example of FIG. 8. From the formulation of EDwP.s($T_1,T_2$), it is guaranteed that $|T'_1|=|T'_2|$, where $T'_1.e_i$ is matched with $T'_2.e_i$. Note that it is possible to contain segments of 0 length in an edited trajectory, as in the last segment of $T_2$. The temporal distance EDwP.t is now defined as follows:

$$EDwP.t(T_1, T_2) = \sum_{i=1}^{|T'_1|} |\text{speed}(T'_1 \cdot e_i) - \text{speed}(T'_2 \cdot e_i)| * \text{Coverage}(T'_1 \cdot e_i, T'_2 \cdot e_i)$$

For example, in revisiting FIG. 8:

$$EDwP.t(T_1, T_2) = \left|\frac{1}{3} - \frac{1}{2}\right| \times 14 + \left|\frac{1}{3} - 1\right| \times 6 + \left|\frac{2}{5} - 0\right| \times 2 = 7.13.$$

As can be seen, EDwP.t re-uses the coverage function to weight the temporal distances of segments based on their lengths. Thus, the ability to adapt to non-uniform sampling rates, along with other useful features such as threshold-free computation and tackling phase shifts, are retained.

It should be understood and appreciated that while discussion herein addresses trajectories defined by two spatial dimensions and a temporal dimension, at least one embodiment of the invention may alternatively address at least one trajectory that is defined by three spatial dimensions instead of just two (e.g., by way of calculating spatial and temporal similarity between two trajectories each defined by three spatial dimensions and a temporal dimension).

Figure 9:
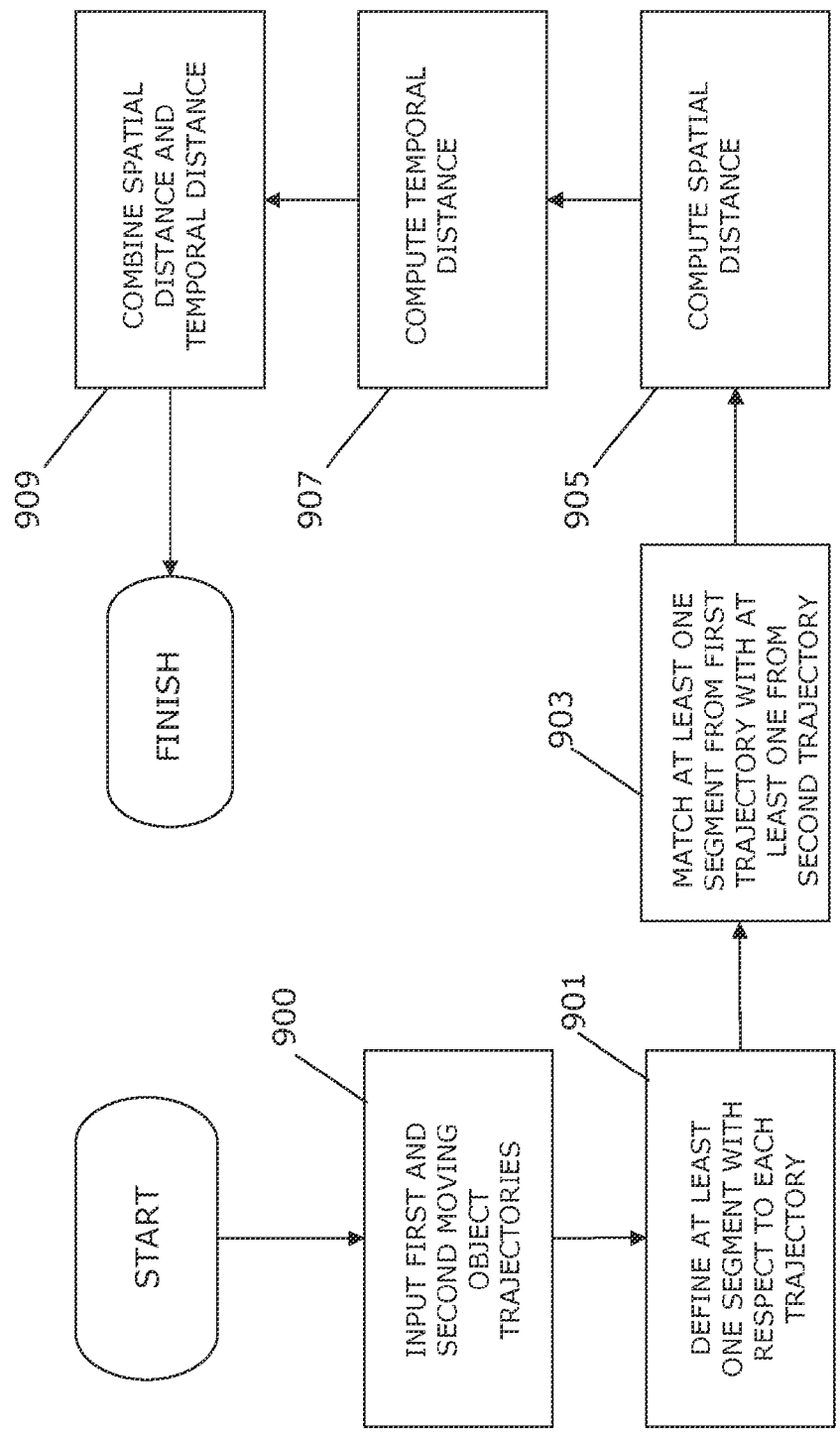
FIG. 9 sets forth a process more generally for measuring similarity with respect to moving object trajectories.

FIG. 9 sets forth a process more generally for measuring similarity with respect to moving object trajectories, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way of a processing unit or units and system memory such as those indicated, respectively, at 16' and 28' in FIG. 10.

As shown in FIG. 9, in accordance with at least one embodiment of the invention, first and second moving object trajectories are input, each trajectory being defined by at least two spatial dimensions and a temporal dimension, each trajectory including at least two defining points (900). At least one segment is defined with respect to each trajectory, each segment being defined between two defining points (901). At least one segment from the first trajectory is matched with at least one segment from the second trajectory (903). A spatial distance is computed between the at least one segment from the first trajectory and the at least one segment from the second trajectory (905). A temporal distance is computed between the at least one segment from the first trajectory and the at least one segment from the second trajectory (907). The spatial distance and temporal distance are combined to provide a measure of a spatio-temporal distance between the at least one segment from the first trajectory and the at least one segment from the second trajectory (909).

Figure 10:
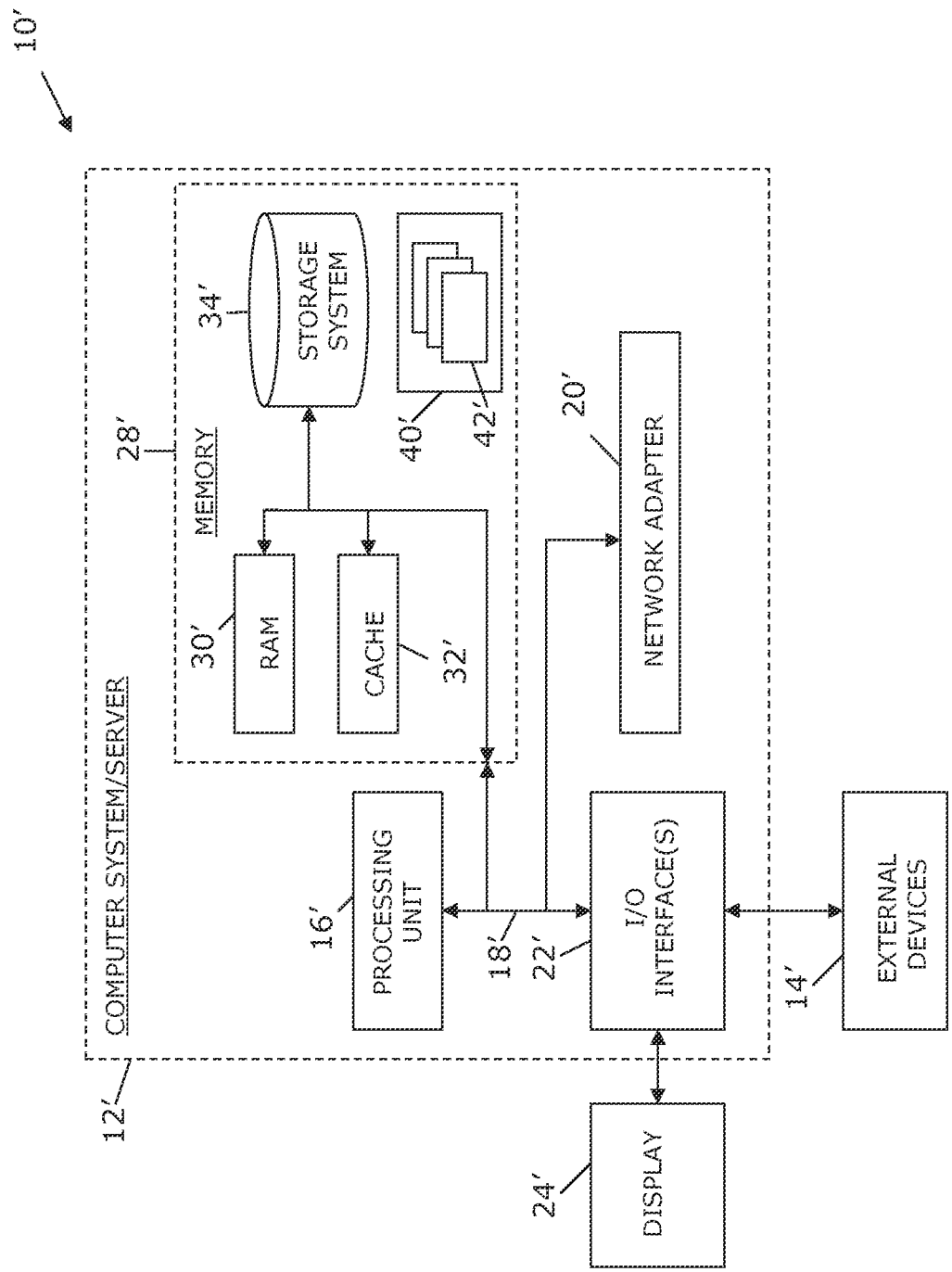
FIG. 10 illustrates a computer system.

Referring now to FIG. 10, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of measuring similarity with respect to moving object trajectories, said method comprising:
    inputting, using a processor, first and second moving object trajectories, each trajectory being defined by at least two spatial dimensions and a temporal dimension, each trajectory including at least two defining points;
    defining, using a processor, at least one segment with respect to each trajectory, each segment being defined by a spatial measure and by a temporal measure between two defining points;
    matching, using a processor, at least one segment from the first trajectory with at least one segment from the second trajectory;
    computing, using a processor, a spatial distance between the at least one segment from the first trajectory and the at least one segment from the second trajectory, based on the spatial measure between the two defining points of each of the at least one segment from the first trajectory and the at least one segment from the second trajectory;
    computing, using a processor, a temporal distance between the at least one segment from the first trajectory and the at least one segment from the second trajectory, based on the temporal measure between the two defining points of each of the at least one segment from the first trajectory and the at least one segment from the second trajectory;
    combining, using a processor, the spatial distance and temporal distance to provide a measure of a spatio-temporal distance between the at least one segment from the first trajectory and the at least one segment from the second trajectory;
    determining a similarity between the first trajectory and the second trajectory based upon the spatio-temporal distance between each of the at least one segment from the first trajectory and the at least one segment from the second trajectory; and
    identifying and tracking, based upon a similarity between the first trajectory and the second trajectory exceeding a predetermined threshold, a location of one of: the first moving object and the second moving object.

2. The method according to claim 1, wherein the at least two defining points comprise at least two sampled points.

3. The method according to claim 1, comprising projecting a defining point of a segment in the first trajectory to create a new defining point in the second trajectory.

4. The method according to claim 3, wherein said projecting comprises projecting a defining point of a segment in the first trajectory to a closest point in the second trajectory.

5. The method according to claim 1, wherein:
    at least one of the first and second trajectories comprises at least three defining points; and
    said defining comprises defining at least two segments with respect to the at least one of the first and second trajectories.

6. The method according to claim 1, wherein said matching comprises undertaking a one-to-one matching of at least one segment from the first trajectory with at least one segment from the second trajectory.

7. The method according to claim 1, wherein said matching comprises undertaking a one-to-one matching of a plurality of segments from the first trajectory with a plurality of segments from the second trajectory.

8. The method according to claim 7, comprising projecting a defining point of a segment in the first trajectory to create a new defining point in the second trajectory.

9. The method according to claim 8, wherein said projecting comprises projecting a defining point in the first trajectory to a closest point in the second trajectory.

10. The method according to claim 8, wherein said matching comprises matching two segments from the first trajectory with two segments from the second trajectory, each of the two segments from the second trajectory being defined between the new defining point and another defining point.

11. An apparatus comprising:
    at least one processor; and
    a non-transitory computer readable storage medium having computer readable program code embodied therewith and executable by the at least one processor, the computer readable program code comprising:

computer readable program code configured to input first and second moving object trajectories, each trajectory being defined by at least two spatial dimensions and a temporal dimension, each trajectory including at least two defining points;

computer readable program code configured to define at least one segment with respect to each trajectory, each segment being defined by a spatial measure and by a temporal measure between two defining points;

computer readable program code configured to match at least one segment from the first trajectory with at least one segment from the second trajectory;

computer readable program code configured to compute a spatial distance between the at least one segment from the first trajectory and the at least one segment from the second trajectory, based on the spatial measure between the two defining points of each of the at least one segment from the first trajectory and the at least one segment from the second trajectory;

computer readable program code configured to compute a temporal distance between the at least one segment from the first trajectory and the at least one segment from the second trajectory, based on the temporal measure between the two defining points of each of the at least one segment from the first trajectory and the at least one segment from the second trajectory;

computer readable program code configured to combine the spatial distance and temporal distance to provide a measure of a spatio-temporal distance between the at least one segment from the first trajectory and the at least one segment from the second trajectory;

computer readable program code configured to determine a similarity between the first trajectory and the second trajectory based upon the spatio-temporal distance between each of the at least one segment from the first trajectory and the at least one segment from the second trajectory; and computer readable program code configured to identify and track, based upon a similarity between the first trajectory and the second trajectory exceeding a predetermined threshold, a location of one of: the first moving object and the second moving object.

12. A computer program product comprising:

a non-transitory computer readable storage medium having computer readable program code embodied therewith, the computer readable program code comprising:

computer readable program code configured to input first and second moving object trajectories, each trajectory being defined by at least two spatial dimensions and a temporal dimension, each trajectory including at least two defining points;

computer readable program code configured to define at least one segment with respect to each trajectory, each segment being defined by a spatial measure and by a temporal measure between two defining points;

computer readable program code configured to match at least one segment from the first trajectory with at least one segment from the second trajectory;

computer readable program code configured to compute a spatial distance between the at least one segment from the first trajectory and the at least one segment from the second trajectory, based on the spatial measure between the two defining points of each of the at least one segment from the first trajectory and the at least one segment from the second trajectory;

computer readable program code configured to compute a temporal distance between the at least one segment from the first trajectory and the at least one segment from the second trajectory, based on the temporal measure between the two defining points of each of the at least one segment from the first trajectory and the at least one segment from the second trajectory;

computer readable program code configured to combine the spatial distance and temporal distance to provide a measure of a spatio-temporal distance between the at least one segment from the first trajectory and the at least one segment from the second trajectory;

computer readable program code configured to determine a similarity between the first trajectory and the second trajectory based upon the spatio-temporal distance between each of the at least one segment from the first trajectory and the at least one segment from the second trajectory; and computer readable program code configured to identify and track, based upon a similarity between the first trajectory and the second trajectory exceeding a predetermined threshold, a location of one of: the first moving object and the second moving object.

13. The non-transitory program product according to claim 12, wherein the at least two defining points comprise at least two sampled points.

14. The non-transitory program product according to claim 12, wherein said non-transitory computer readable program code is configured to project a defining point of a segment in the first trajectory to create a new defining point in the second trajectory.

15. The non-transitory program product according to claim 14, wherein said non-transitory computer readable program code is configured to project a defining point of a segment in the first trajectory to a closest point in the second trajectory.

16. The non-transitory program product according to claim 12, wherein:
at least one of the first and second trajectories comprises at least three defining points; and
said non-transitory computer readable program code is configured to define at least two segments with respect to the at least one of the first and second trajectories.

17. The non-transitory program product according to claim 12, wherein said non-transitory computer readable program code is configured to undertake a one-to-one matching of at least one segment from the first trajectory with at least one segment from the second trajectory.

18. The non-transitory program product according to claim 12, wherein said non-transitory computer readable program code is configured to undertake a one-to-one matching of a plurality of segments from the first trajectory with a plurality of segments from the second trajectory.

19. The non-transitory program product according to claim 18, wherein said non-transitory computer readable program code is configured to project a defining point of a segment in the first trajectory to create a new defining point in the second trajectory.

20. A method comprising:
computing, using a processor, spatial and temporal similarity between two moving object trajectories;
said computing comprising:
determining, using a processor, a number of sampling points with respect to each trajectory;
thereupon determining, using a processor, whether one trajectory has more sampling points than the other trajectory and, if so, projecting at least one sampling point from the trajectory with more sampling points onto the trajectory with fewer sampling points;

dividing, using a processor, each of the trajectories into segments, each segment being defined between two defining points by a spatial measure and by a temporal measure;

matching and comparing, using a processor, each segment one-to-one with a segment from the other trajectory, and determining spatial and temporal similarity between pairs of segments between the trajectories, based on the spatial measure and the temporal measure between the two defining points of each segment; and identifying and tracking, based upon a similarity between the first trajectory and the second trajectory exceeding a predetermined threshold, a location of one of the moving objects.

* * * * *